Figures 1, 2, 3, 4:
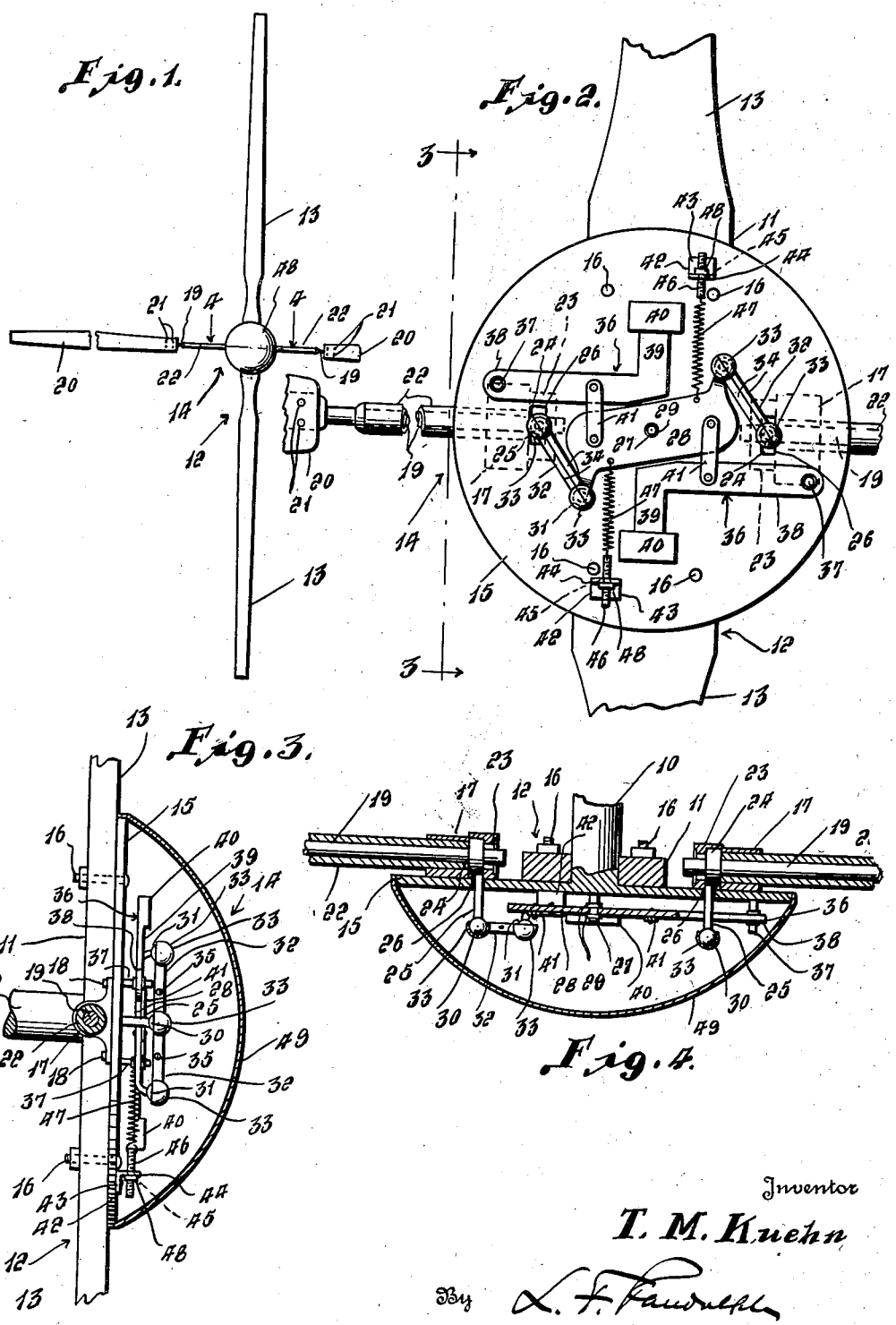

April 27, 1943. T. M. KUEHN 2,317,778
GOVERNOR ATTACHMENT FOR IMPELLERS
Filed May 8, 1941

Inventor
T. M. Kuehn,
By
Attorney

Patented Apr. 27, 1943

2,317,778

UNITED STATES PATENT OFFICE 2,317,778

GOVERNOR ATTACHMENT FOR IMPELLERS

Theadore M. Kuehn, Nara Visa, N. Mex.

Application May 8, 1941, Serial No. 392,549

3 Claims. (Cl. 170—68)

This invention relates to a novel construction of governor for impellers, and more particularly to a governor for use on wind impellers such as those employed for driving electric generators, and where it is advisable to limit the speed of rotation of the impeller.

More particularly, it is an aim of the invention to provide a governor which will not only function to prevent the impeller from exceeding a certain speed but will also function to assist the impeller to operate as nearly as possible to its desired maximum speed so that whereas the governor will function efficiently to retard the speed of rotation of the impeller after it has reached its maximum speed, as for example in high winds, it will also function to increase the speed of the impeller where it is operating below its maximum speed, as for example in a light breeze.

Still another aim of the invention is to provide a governor attachment of simple construction capable of being economically manufactured and sold and which may be readily attached to conventional wind impellers already in use and which will operate efficiently at all times and require slight attention and repair.

Still another aim of the invention is to provide a governor which can be readily adjusted to vary the speed at which it will permit the impeller to operate to compensate for variations in loads that might be placed upon the impeller.

Other objects and advantages of the invention will hereinafter become more fully apparent from the following description of the drawing, which illustrates a preferred embodiment thereof, and wherein:

Figure 1 is a fragmentary front elevational view showing the governor applied to a conventional wind impeller, Figure 2 is an enlarged fragmentary view of the same, showing the cover or dust cap removed, Figure 3 is a vertical sectional view taken substantially along the plane of the line 3—3 of Figure 2, showing the cover or dust cap in central vertical section in an applied position, and Figure 4 is an enlarged longitudinal horizontal sectional view taken substantially along the plane of the line 4—4 of Figure 1.

Referring more particularly to the drawing, wherein like reference characters designate like or corresponding parts throughout the different views, 10 designates the outer end of a rotatably mounted shaft which constitutes the driven shaft of the impeller and to which is keyed the hub 11 of the impeller, designated generally 12 which is provided with two impeller blades 13 which project from the hub 11 in opposite directions to one another, and which are pitched in the same direction. The blades 13, in the embodiment of the invention as illustrated, are pitched to cause the impeller to revolve in a clockwise direction, as seen in Figure 1. The parts previously described are of conventional construction and are illustrated and described merely to illustrate the application of the speed governing attachment, designated generally 14 and comprising the invention. The governor 14 includes a plate 15 which is secured to the hub 11 by fastenings 16, and which is disposed on the outer side thereof. Bearings 17 are connected by fastenings 18 to the back side of the plate 15, and are disposed substantially at right angles to the two blades 13. The pair of bearings 17 form journals for shafts 19 which form the shanks or roots of governor blades 20 which are secured at their inner ends by fastenings 21 to the outer ends of the shafts 19 and which project in opposite directions relatively to one another and which are disposed substantially at right angles to the impeller blades 13. The shafts 19 are also journaled in bushings 22 which are connected to the bearings 17 and which project outwardly therefrom. Bearings 17 are preferably provided with anti-friction bearings 23 for journaling the shafts 19, and as best seen in Figure 4, the shafts 19 are provided with collars which are disposed within the bearings 17. Said collars 24 are rotatably mounted in the bearings 17, and are provided with arms 25 which project outwardly therefrom through elongated slots 26 in the plate 15. The slots 26 are disposed crosswise to the shafts 19 so that the arms 25 may be swung therein for turning the governor blades 20 on their longitudinal axes to change the pitch of said blades.

A stud or pin 27 projects outwardly from the center of the forward side of the plate 15 and an elongated lever 28 is pivotally mounted intermediate of its ends on the stud 27 and is detachably retained in position thereon by nuts or other suitable means 29. The arms 25 are provided at their outer, free ends with balls 30, and the lever 28 is provided at its ends with outwardly projecting balls 31. The adjacently disposed balls 30 and 31 are connected by means of links 32 having socket portions 33 in the ends thereof for engaging the balls 30 and 31. The links 32 are preferably divided longitudinally into corresponding sections 34 which are connected intermediate of their ends by fastenings 35 to permit the links 32 to be readily applied or removed.

A pair of corresponding governor members 36 are pivotally connected at corresponding ends thereof at 37 to the forward side of the plate 15. The governor members 36 are pivotally connected at 37 at diametrically opposed points adjacent to and on opposite sides of the bearings 17. Each of the governor members 36 includes a long end 38, said long ends 38 being pivoted at 37 and extending inwardly from their pivots toward the axis of the impeller blades 13. The ends 38, at their opposite, adjacent terminals, merge with the opposite, shorter ends 39 of the governor members 36 which are disposed substantially at right angles to the ends 38 and project therefrom in opposite directions to one another, as best seen in Figure 2. The ends 39 are provided with weighted enlargements 40 at their outer terminals. A pair of links 41 are each connected pivotally at one end to the lever 28 adjacent an end thereof, and said links are each pivotally connected at their opposite ends to a governor member 36, intermediate of its end 38 so that each of the governor members 36 is connected by a link 41 to an end of the lever 28. A pair of brackets 42 are attached to the outer side of the plate 15, said brackets being disposed in diametrically opposed relationship to one another and adjacent the periphery of the plate 15 and adjacent the axes of the blades 13. The brackets 42 are attached to the plate by fastenings 43, and are provided with outwardly projecting ends 44 having openings 45 through which threaded bolts 46 loosely extend, and an expansion coil spring 47 is attached at one end to the inner, adjacent end of each of the bolts 46 and the opposite ends of the contractile coil springs 47 are connected to the lever 28, adjacent its ends, said springs 47 being disposed adjacent the links 41 which are attached to the governor members 36 which are disposed on the opposite side of the lever 28. A nut 48 is carried by the outer end of each of the bolts 46, said nuts engaging against the outer sides of the portions 44 and being adjustable for adjusting the tension of the springs 47.

A dome shaped dust cap 49 is detachably connected to the periphery of the plate 15 and projects outwardly from the forward side thereof to enclose parts mounted on the forward side of the plate 15.

When the parts carried by the plate 15 are in the positions, as seen in Figure 2, the impeller 12 is idle, and in this position the blades 20 are pitched in the same direction as the impeller blades 13 so that they will cooperate with the blades 13 and function as impeller blades. As the speed of rotation of the blades 13 increases the ends 39 of the governor members 36 are urged outwardly relatively to one another by centrifugal force and against the action of the springs 47 to thereby turn the lever 28 in a clockwise direction to cause the shafts 19 and the governor blades 20 to be rotated on their axes in a counterclockwise direction, as seen in Figure 3, which will decrease the pitch of the governor blades 20 to thereby reduce their efficiency as impeller blades. When the impeller 12 reaches its maximum desired operating speed the ends 39 of the governor members 36 will have been swung outwardly sufficiently so that the blades 20 will be in non-pitched positions, and if the speed of rotation of the impeller 12 increases beyond this point the lever 28 will be caused to turn still further in a clockwise direction for continuing the rotation of the blades 20 on their longitudinal axes to cause them to be pitched in the opposite direction to the impeller blades 13 so that they will act to retard the rotation of the impeller 12 and to prevent it from exceeding its desired maximum speed. As the speed of rotation of the impeller 12 diminishes the springs 47 will tend to turn the lever 28 in a counterclockwise direction to retract the governor members 36 to return the blades 20 toward their original positions, pitched in the same directions as the impeller blades 13. It will be obvious, that by increasing the tension of the springs 47 by tightening the nuts 48, that the action of the centrifugal governor members 36 will be retarded to permit the impeller 12 to turn at a greater speed before the governor blades 20 begin to retard the rotation of the impeller or by loosening the nuts 48 to decrease the tension of the springs 47 the centrifugal governor members can act more promptly to cause the governor blades 20 to begin to retard the speed of rotation of the impeller 12 at a lower speed.

Various modifications and changes are contemplated and may obviously be resorted to as only a preferred embodiment of the invention has been disclosed.

I claim as my invention:

1. A governor attachment for wind impellers comprising a supporting member adapted to be attached to the center of a wind impeller, bearings attached to the rear side of said supporting member, governor blades having shanks journaled in said bearings, said blades projecting outwardly in opposite directions relatively to one another, arms secured to and projecting from the shanks of said governor blades, a lever pivotally connected intermediate of its ends to said supporting member, links connecting the ends of said lever to the free ends of said arms, centrifugal governor members pivotally connected to the supporting member and mounted to swing outwardly relatively to one another, and links pivotally connecting said governor members, intermediate of their ends, to the ends of said lever to change the pitch of the impeller blades when the governor members are actuated by centrifugal force.

2. A governor attachment as in claim 1, said governor blades being initially pitched in the same direction as the impeller blades to normally function as additional impeller blades, and said centrifugal governor members being operative to reduce the pitch of the governor blades as the speed of rotation of the impeller increases, and to move the governor blades into positions so that they will be pitched in the opposite direction to the impeller blades when the speed of rotation of the impeller exceeds a certain speed.

3. A governor attachment for impellers comprising a support attached to the hub portion of an impeller, governor blades having shank ends journaled in the support, said governor blades extending radially from the support and being spaced from the blades of the impeller and normally pitched in the same direction to provide supplementary impeller blades, said governor blades being turnable on their longitudinal axes, a lever pivotally mounted intermediate of its ends on the support, said shank ends being provided with cranks, links connecting the free ends of the cranks to the ends of the lever so that when the lever is swung on its pivot the governor blades will be rotated on their axes to vary the pitch thereof, centrifugal governor members connected to the support and extending toward the lever and having outturned inner ends projecting in opposite directions, links connecting the centrifugal governors, adjacent their inner ends, to the ends of the lever so that when the governors are swung outwardly by centrifugal force the pitch of the governor blades will be reduced and varied until they are pitched in the opposite direction to the impeller blades, and spring means for urging the governors back to retracted positions.

THEADORE M. KUEHN.